United States Patent
Dayt et al.

(10) Patent No.: US 8,850,658 B2
(45) Date of Patent: Oct. 7, 2014

(54) SHOCK-ABSORBING CASTOR

(75) Inventors: Patrick Dayt, Besancon (FR); Christian Marchand, Torpes (FR)

(73) Assignee: Tente Roulettes Polymeres-Bruandet, La Barre (FR)

( * ) Notice: Subject to any disclaimer, the term of this patent is extended or adjusted under 35 U.S.C. 154(b) by 0 days.

(21) Appl. No.: 13/877,712

(22) PCT Filed: Sep. 9, 2011

(86) PCT No.: PCT/FR2011/000497
§ 371 (c)(1), (2), (4) Date: Apr. 4, 2013

(87) PCT Pub. No.: WO2012/045921
PCT Pub. Date: Apr. 12, 2012

(65) Prior Publication Data
US 2013/0205544 A1 Aug. 15, 2013

(30) Foreign Application Priority Data
Oct. 8, 2010 (FR) .................................. 10 03989

(51) Int. Cl.
*B60B 33/00* (2006.01)
*B60B 5/02* (2006.01)
*B60B 1/00* (2006.01)

(52) U.S. Cl.
CPC ......... *B60B 33/006* (2013.01); *B60B 2200/242* (2013.01); *B60B 33/0068* (2013.01); *B60B 33/0073* (2013.01); *B60B 33/0005* (2013.01); *B60B 2200/26* (2013.01); *B60B 33/0028* (2013.01); *B60B 33/0042* (2013.01); *B60B 5/02* (2013.01); *B60B 33/0049* (2013.01); *B60B 1/006* (2013.01); *B60B 2900/131* (2013.01); *B60B 2900/133* (2013.01); *B60B 33/0057* (2013.01)

USPC .................... 16/44; 16/35 D; 16/31 R; 16/43

(58) Field of Classification Search
USPC ........ 16/44, 35 D, 35 R, 45, 38, 39, 31 R, 43; 280/250.1, 86.1, 483, 485; 180/21; 267/153, 195, 196, 257, 258, 292, 293
See application file for complete search history.

(56) References Cited

U.S. PATENT DOCUMENTS 3,537,125 A * 11/1970 Arenson ..................... 16/31 R
3,718,942 A * 3/1973 Arenson ...................... 16/37
(Continued)

FOREIGN PATENT DOCUMENTS

DE        2 937 571      4/1981
GB        2 229 914     10/1990
WO     2006/053589      5/2006

OTHER PUBLICATIONS

International Search Report dated Dec. 19, 2011, corresponding to PCT/FR2011/000497.

*Primary Examiner* — Chuck Mah
(74) *Attorney, Agent, or Firm* — Young & Thompson

(57) ABSTRACT

A castor includes a casing constituted by a part having at least one housing suitable for receiving a pivot defined on an axis, and a bearing defined on an axis perpendicular to the axis, at least one wheel suitable for running on a surface, a shaft mounted to co-operate in the bearing, the wheel being mounted in association with the shaft, the part being constituted by at least two portions and that are made respectively of two materials of different flexibilities, the portion presenting the greater flexibility being interposed between the housing and the axial orifice of the bearing so as to isolate the housing and the bearing from each other. The castors may be used with furniture or the like, in particular in a hospital setting, e.g. for beds, tables, walkers, and also for moving suitcases, baggage, or the like.

14 Claims, 1 Drawing Sheet

(56) References Cited

U.S. PATENT DOCUMENTS

| | | | |
|---|---|---|---|
| 3,768,116 A * | 10/1973 | Propst et al. | 16/43 |
| 4,120,071 A * | 10/1978 | Crescenzi | 16/37 |
| 4,485,521 A * | 12/1984 | Welsch et al. | 16/44 |
| 4,524,482 A * | 6/1985 | Mueller | 16/44 |
| 4,550,808 A * | 11/1985 | Folson | 188/1.12 |
| 4,649,595 A * | 3/1987 | Shane | 16/18 CG |
| 5,305,496 A * | 4/1994 | Gagnon et al. | 16/44 |
| 5,371,921 A * | 12/1994 | Roe | 16/35 R |
| 5,400,469 A * | 3/1995 | Simonsen | 16/44 |
| 7,093,319 B2 * | 8/2006 | Lemeur et al. | 16/44 |
| 2004/0000025 A1 * | 1/2004 | LeMeur et al. | 16/44 |

* cited by examiner

SHOCK-ABSORBING CASTOR

BACKGROUND OF THE INVENTION

1. Field of the Invention

The present invention relates to castors for associating with any type of article that is movable in the broad sense in order to make the article easier to move over a floor surface, e.g. castors that find an application in moving hospital equipment and furniture, beds, tables, wheelchairs, carriages, walkers, and also castors for moving suitcases, baggage, or the like.

Such a castor essentially comprises at least one wheel, generally two wheels, a casing for supporting and protecting the wheels, and a pivot that provides a connection between the casing and the movable article.

Its structure needs to be designed so as to make it easy to move the movable article with which it is associated in any direction.

For this purpose, it generally comprises two parallel-mounted wheels, means for enabling those two wheels to rotate about a horizontal shaft relative to the casing in order to run on the floor so as to move the movable article in rectilinear translation, and also means to enable the casing to be connected to the movable article so as to be capable of pivoting relative to the article about an axis that is substantially vertical and thus enable the castor to take up any direction relative to the article so as to make it easy to steer the article around curves.

2. Description of the Related Art

When such castors are used, e.g. in a hospital or the like, for the purpose of moving a piece of furniture carrying a patient or items such as instruments, various fluids, and other medical equipment that is relatively fragile, it is preferable to avoid subjecting the patient or those items to shocks that are too great, e.g. when the movable article is moved over a floor surface that presents discontinuities such as the thresholds of certain doors, e.g. fire-break doors or the like. It is therefore advantageous for the castors to be capable of absorbing such shocks, at least in part. The same applies to baggage or the like associated with such castors.

It is also preferable for such castors to avoid making too much noise when running on the floor surface, in particular in a hospital or the like in order to keep it quiet for hospital patients, or in any other location when moving suitcases, baggage, or the like.

A castor with a shock absorber is already known, such as that described and shown in DE 2 937 571. That castor essentially comprises a casing constituted by a first portion and a second portion that are made respectively of two materials of different flexibility, the second portion, which is made of the material having the greater flexibility, being the portion that constitutes the housing for the pivot and thus the bearing for the shaft of the wheel. This second portion is made of rubber and is fastened to the first by means of a pin, and it therefore cannot be molded with the first portion. Furthermore, since the second portion is made of a material that is very flexible and that is directly in contact with the shaft of the wheel, it is very difficult for the material to support the shaft, and the shaft is therefore easily made to oscillate e.g. when the castor runs over the floor and encounters roughnesses or the like. In addition, the second portion is subjected to wear that is very fast.

BRIEF SUMMARY OF THE INVENTION

An object of the present invention is to provide a castor that seeks to achieve the above-mentioned objects while presenting a structure that is simple, inexpensive, and easy to make and/or fabricate, while giving a shock-absorbing result that is as good as that of the above-defined castor in particular, but without its drawbacks.

More precisely, the present invention provides a castor suitable for running on a surface, and having in particular the characteristics set out in accompanying claim 1.

BRIEF DESCRIPTION OF THE DRAWINGS

Other characteristics and advantages of the invention appear from the following description given with reference to the accompanying drawings by way of non-limiting illustration, and in which.

DETAILED DESCRIPTION OF THE PREFERRED EMBODIMENTS

Figure 1:
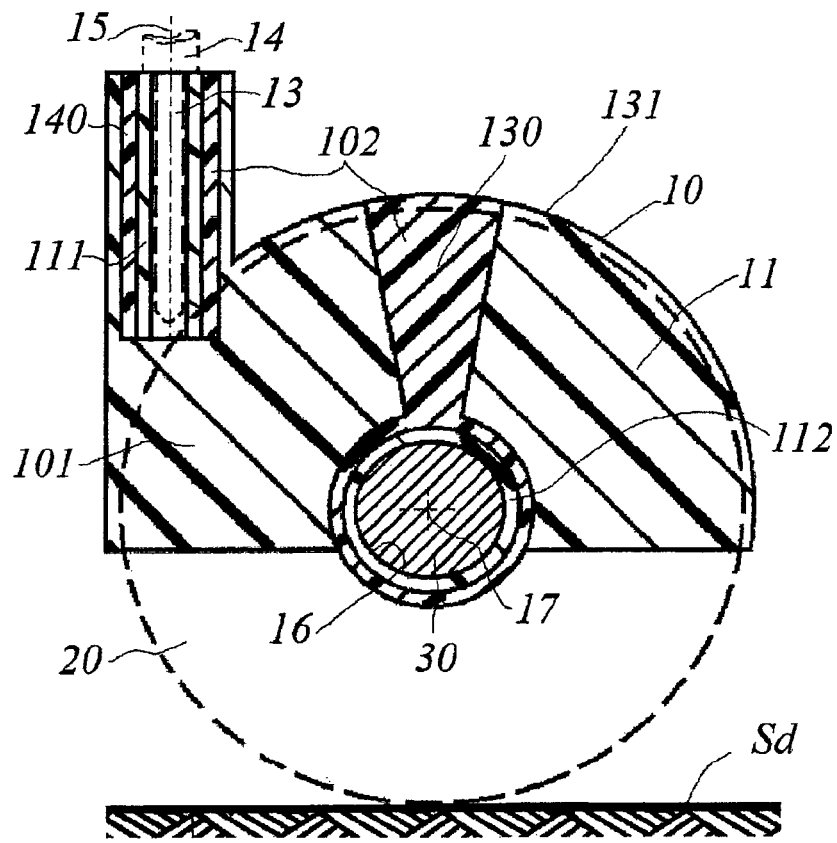
FIG. 1 is a side view in section showing an embodiment of a castor of the invention.

With reference to the two accompanying figures, the present invention relates to a castor for running on a surface Sd.

Such a castor comprises a casing 10 constituted by a part 11 that is obtained by molding, and that is generally in the form of half a right circular cylinder. Such a casing is itself well known and is not described in greater detail herein, the content of the figures sufficing to define it in the eyes of a person skilled in the art.

The part 11 includes at least a housing 13 suitable for receiving a pivot 14 defined along a first axis 15, and at least a bearing 16 for a rotary shaft, this bearing being defined on a second axis 17 that is substantially perpendicular to the first axis and substantially parallel to the surface Sd, it being understood that such a bearing is constituted by a surface that is generally in the shape of a right circular cylinder defining an axial orifice that is suitable for having a rotary shaft of at least one wheel inserted therein.

Figure 2:
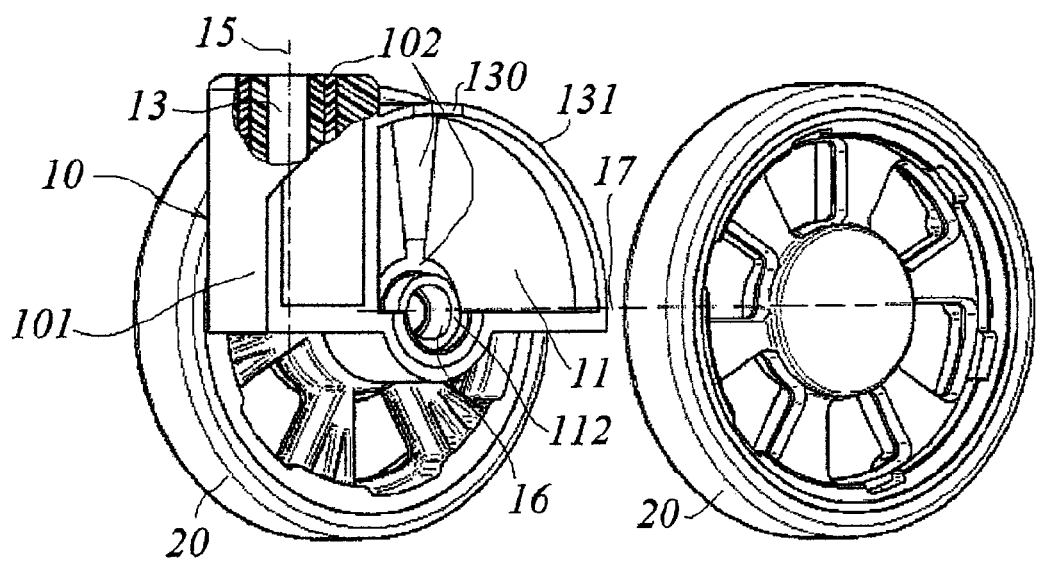
FIG. 2 is a perspective view that is exploded and partially cutaway showing the same embodiment of the castor of the invention as that shown in section in FIG. 1.

The castor has at least one wheel 20, and more generally two wheels as can be seen in FIG. 2, the wheel(s) being are suitable for making rolling contact with the surface Sd, and a rotary shaft 30 mounted to co-operate in the bearing 16, the wheel 20 being mounted in association with the rotary shaft.

It should be emphasized that all of the following methods of assembling the above-described elements are possible: either the shaft is secured to the wheel(s) and is mounted to rotate in the bearing; or the shaft is secured to the bearing and the wheel is rotatably mounted thereon; or else, less frequently, the shaft is mounted to rotate both relative to the bearing and relative to the wheel(s). These assembly methods form part of the competence of the person skilled in the art and they are not described in greater detail herein.

According to an important characteristic of the invention, the part 11 is made up of at least first and second portions 101 and 102 made respectively out of two materials having different flexibilities, the second portion 102 being the portion that is made in the material presenting the greater flexibility and being interposed between the housing 13 and the axial orifice of the bearing 16, so as to isolate the housing and the bearing from each other and thus achieve at least one of the following two effects, at least in part: sound insulation; and absorbing shocks against the wheels;

In an advantageous embodiment, such as that shown in the two figures, the first portion 101 comprises a first fraction 111 and a second fraction 112, the first fraction 111, in which the housing 13 is made, being interposed between the housing 13 and the second portion 102, i.e. the portion made of a material that presents the greater flexibility, and the second fraction 112, in which the bearing 16 is made, being interposed between the axial orifice of the bearing 16 and the same second portion 102.

By way of example, as shown in FIGS. 1 and 2, and preferably, the second fraction 112 is in the form of a bushing having its central orifice constituting the axial orifice of the above-defined bearing 16, and the second portion 102 is then in the form of a sleeve surrounding the bushing.

Furthermore, since shocks can be absorbed by small deformations of the sleeve, this deformation will tend to cause one of the two portions of the casing located on either side of the plane containing the second axis 17 and perpendicular to the surface Sd to turn relative to each other in one direction or the other. In order to absorb shocks, it is therefore most advantageous, as shown in the figures, for the second portion 102 also to include a wall 130 connecting the sleeve with the periphery 131 of the part 11, without any discontinuity. In most preferred manner, this wall 130 is substantially in the shape of a truncated wedge having its small base secured to the sleeve, as shown in the figures.

Preferably, this wall 130 is also situated in the above-defined plane.

Whether or not in combination with the above embodiment, it is also advantageously possible for the second portion 102 to be constituted by a cylindrical insert 140 surrounding and in contact with the first fraction 111 so as to obtain simultaneously both shock absorption and sound absorption concerning vibration that can be transmitted by the pivot 14, which pivot is generally made of metal and is thus relatively rigid and a good transmitter of vibration.

In a preferred embodiment that gives relatively good results, the first portion 101 is made of polyamide and the second portion 102 is made of polyurethane. The part 11 can easily be made in a single operation using the bi-injection molding technique, that is itself well known.

Finally, in most advantageous manner, the castor of the invention comprises in combination:
  a casing 10 constituted by a molded part 11, the part comprising at least:
    a housing 13 suitable for receiving a pivot 14 defined on a first axis 15; and
    a bearing 16 for a rotary shaft, the bearing being defined on a second axis 17 that is substantially perpendicular to the first axis and substantially parallel to the surface Sd;
  at least one wheel 20 suitable for making rolling contact with the surface Sd; and
  a rotary shaft 30 mounted to co-operate in the bearing 16, with the wheel 20 being mounted in association with the rotary shaft.

The part 11 is made up of at least first and second portions 101 and 102 that are made respectively of two materials of different flexibilities, the second portion 102 being the portion that is made in the material presenting the greater flexibility and being interposed between the housing 13 and the axial orifice of the bearing 16 so as to isolate them from each other.

The first portion 101 comprises:
  a first fraction 111, in which the housing 13 is made, this first fraction 111 being interposed between the housing 13 and the second portion 102; and
  a second fraction 112, in which the bearing 16 is made, the second fraction 112 being interposed between the axial orifice of the bearing 16 and the second portion 102, this second fraction 112 being in the form of a bushing with its central orifice constituting the axial orifice of the bearing 16.

The second portion 102 comprises:
  a sleeve surrounding the bushing;
  a wall 130 connecting the sleeve with a periphery 131 of the part 11 without discontinuity, and presenting the shape of a truncated wedge with its small base secured to the sleeve; and
  a cylindrical insert 140 surrounding the first fraction 111 and in contact therewith.

In this embodiment, the first portion 101 is made of polyamide and the second portion 102 is made of polyurethane, the part 11 being obtained by bi-injection molding of these two materials.

The invention claimed is:

1. A castor suitable for running on a surface (Sd), the castor comprising:
   a casing (10) constituted by a molded part (11), said part comprising at least:
     a housing (13) suitable for receiving a pivot (14) defined on a first axis (15); and
     a bearing (16) for a rotary shaft, said bearing being defined on a second axis (17) that is substantially perpendicular to the first axis and substantially parallel to said surface (Sd), said bearing (16) being defined by a surface that is generally of right cylindrical shape defining an axial orifice;
   at least one wheel (20) suitable for making rolling contact with said surface (Sd); and
   a rotary shaft (30) mounted to co-operate in said bearing (16), with said wheel (20) being mounted in association with said rotary shaft,
   wherein the molded part (11) is made of at least first and second portions (101, 102) made respectively of two materials of different flexibilities, the second portion (102) being the portion that is made of the material presenting the greater flexibility, and
   wherein the second portion (102) comprises first and second elements, the first element being disposed within the housing (13) and the second element being in the form of a wall and encircling the shaft so as to isolate the housing and the bearing from each other.

2. A castor according to claim 1, characterized by the fact that said first portion (101) comprises a first fraction (111) located in said housing (13), and said second portion (102), and a second fraction (112) located between the axial orifice of said bearing (16) and the casing.

3. A castor according to claim 2, characterized by the facts that the second fraction (112) is in the form of a bushing having its central orifice constituting the axial orifice of the bearing (16), and that said second portion (102) is in the form of a sleeve surrounding said bushing.

4. A castor according to claim 3, characterized by the fact that said second portion (102) further includes a wall (130) connecting said sleeve to the periphery (131) of said part (11) without discontinuity.

5. A castor according to claim 4, characterized by the fact that said wall (130) is substantially in the form of a truncated wedge having its small base secured to the sleeve.

6. A castor according to claim 3, characterized by the fact that said first portion (101) is made of polyamide and the second portion (102) is made of polyurethane.

7. A castor according to claim 4, characterized by the fact that said first portion (101) is made of polyamide and the second portion (102) is made of polyurethane.

8. A castor according to claim 5, characterized by the fact that said first portion (101) is made of polyamide and the second portion (102) is made of polyurethane.

9. A castor according to claim 2, characterized by the fact that said second portion (102) is constituted by a cylindrical insert (140) surrounding and in contact with said first fraction (111).

10. A castor according to claim 9, characterized by the fact that said first portion (101) is made of polyamide and the second portion (102) is made of polyurethane.

11. A castor according to claim 2, characterized by the fact that said first portion (101) is made of polyamide and the second portion (102) is made of polyurethane.

12. A castor according to claim 1, characterized by the fact that said first portion (101) is made of polyamide and the second portion (102) is made of polyurethane.

13. A castor according to claim 1, characterized by the fact that the part (11) is obtained by bi-injection molding.

14. A castor according to claim 1, wherein,
said first portion (101) comprises:
   a first fraction (111) located in said housing (13); and
   a second fraction (112) located between the axial orifice of said bearing (16) and the casing, and being in the form of a bushing having its central orifice constituting the axial orifice of said bearing (16);
said second portion (102) comprises:
   a sleeve surrounding said bushing;
   a wall (130) connecting said sleeve to the periphery (131) of said part (11) without discontinuity, said wall presenting substantially the shape of a truncated wedge with its small base being secured to the sleeve;
   a cylindrical insert (140) surrounding said first fraction (111) and in contact therewith; and
said first portion (101) being made of polyamide and said second portion (102) being made of polyurethane, said part (11) being obtained by bi-injection molding of these two materials.

* * * * *